May 26, 1936. W. G. COOK 2,042,169
MOTOR CONTROL SYSTEM
Filed July 24, 1934
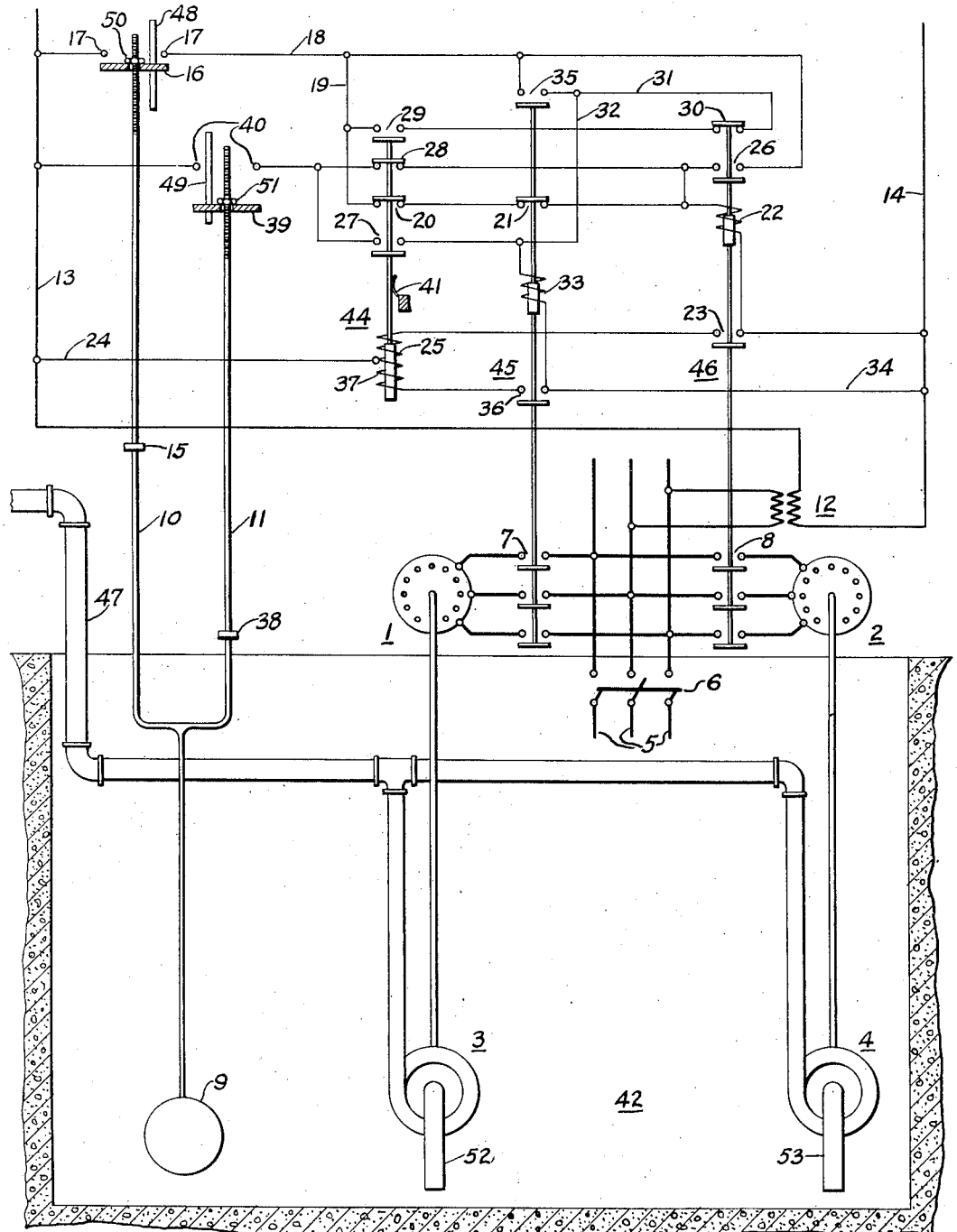
WITNESSES:
Leon J. Jaza
Wm. C. Groome
INVENTOR
Willard G. Cook
BY
Paul E. Friedemann
ATTORNEY Patented May 26, 1936

2,042,169

UNITED STATES PATENT OFFICE 2,042,169

MOTOR CONTROL SYSTEM

Willard G. Cook, Forest Hills, Pa., assignor to Westinghouse Electric & Manufacturing Company, East Pittsburgh, Pa., a corporation of Pennsylvania Application July 24, 1934, Serial No. 736,662

2 Claims. (Cl. 172—239)

This invention relates to a control system for motors and more particularly, to a system of control wherein a plurality of motors are adapted to operate in a predetermined sequence for certain predetermined operating conditions and in a different sequence for certain other predetermined operating conditions.

There are many installations where a plurality of motors are disposed to do a certain work but wherein only one motor is needed to do the work under normal conditions or wherein but few of the entire number of motors are needed to do the work under normal conditions. Under abnormal conditions, it is necessary that all of the motors be set in operation to do the work. In such situations or operating requirements, it is very desirable that the motors be operated in a predetermined sequence, so that all of the motors and the machines they may be driving receive the same wear and, therefore, operate at substantially the same efficiency at any given time during their useful life, and further the inspector or attendant is apprised of the fact that all of the motors are at all times in operating condition. For instance, if a pair of motors are used, these motors may be alternately operated during normal conditions and during abnormal conditions, both of the motors may be operated simultaneously or if one motor should fail the motor in operative condition will, for otherwise normal conditions, operate intermittently and for abnormal conditions operate continuously. This method of operation is particularly useful in drainage systems or systems for disposing sewage or other liquids where the flow of the liquid to a receptacle or sump has some normal value but wherein the flow may have abnormally high values at certain other times.

My system is also of great utility for maintaining a certain average level of liquid in a stand pipe or other reservoir. If the demand is normal the motors will alternately pump to supply liquid to the stand pipe but if the demand is great both motors will operate to pump liquid into the tank or stand pipe.

One of the objects of my invention is to provide a system of control for operating a plurality of motors in a predetermined sequence under normal operating conditions and all of the motors simultaneously under abnormal operating conditions.

Another object of my invention is to provide for alternately operating a pair of motors under normal conditions and to provide for simultaneously operating both motors under abnormal conditions.

A further object of my invention is to provide a system of control for a plurality of motors wherein the motors are adapted to be operated in a predetermined sequence by the rise and fall of a liquid in a receptacle or tank, and to provide for the simultaneous operation of all of the motors when the rise of the liquid in the tank exceeds a given value.

A still further object of my invention is to provide for controlling a pair of motors operating a pair of pumps by effecting the alternate operation of the motors by a predetermined rise of a liquid in the tank and to provide for simultaneously operating both motors when the rise of the liquid in the tank exceeds a predetermined value.

Other objects and advantages will become more apparent from a study of the following specification when taken in conjunction with the single figure of the drawing diagrammatically illustrating my invention.

Referring more particularly to the drawing, 1 and 2 diagrammatically illustrate a pair of electric motors suitably coupled to a pair of pumps 3 and 4 disposed to discharge liquid from the sump or tank 42 through the pipe 47 to some suitable general drainage system or sewer pipe.

The motors 1 and 2, as illustrated in the particular installation herein described, are a pair of induction motors adapted to be connected to the energized buses 5 through the main circuit breaker 6 and a pair of switches 7 and 8 controlled by the contactors 45 and 46. A float 9 is adapted to rise and fall in the sump 42 and by suitably controlling a pair of contact members 16 and 39 is adapted to control the sequence of operation of the motors 1 and 2 under normal conditions, and also the simultaneous operation of the motors under abnormal conditions. Cooperating with the float is a sequence control relay 44 which is provided with a pair of coils, 25 and 37, which may be energized in a certain sequence, explained more in detail hereinafter. Sufficient to say, the relay 44 is of the type wherein the armature and the contact members controlled thereby, or connected thereto, remain in the position to which they have been moved by the particular coil which may have acted on the armature. This is illustrated somewhat diagrammatically by the friction spring 41 engaging the stem of the armature of the relay to hold it in a given position.

When the main circuit breaker or switch 6 is closed, the transformer 12 is energized, thereby energizing the control buses 13 and 14. Energization of the control buses 13 and 14 does not establish any control circuits except when the liquid in the sump 42 has risen above a predetermined level.

The contact members 16 and 39 controlled by the stems 10 and 11 connected to the float 9, engage a pair of friction members 48 and 49, which friction members are adapted to hold the contact members in a given position unless positively acted upon by the lugs 15 and 50 on stem 10, or 38 and 51 on stem 11. In the drawing the sump 42 is shown as being empty so that the contact members 16 and 39 are moved to the open circuit position by the lugs 50 and 51, respectively.

If the liquid in the sump 42 rises to a given value the float 9 in the sump 42, riding on the liquid, causes the stems 10 and 11 to move through the apertures in the contact members 16 and 39 and at a predetermined level the lug 15 will engage the contact member 16. Contact member 16 is thus carried upwardly to bridge the contact fingers 17, whereupon a circuit is established from the energized control bus 13 through the contact fingers 17 bridged by the contact member 16, conductors 18 and 19, contact members 20 and 21, actuating coil 22, of the contactor 46 to the control bus 14. Energization of the contactor 46 closes the switches 8, thereby causing the operation of motor 2 and thus the pump 4, which will thus draw liquid from the sump 42 through the intake tube 53 and discharge the liquid to the general sewer through the tube 47.

The operation of the contactor 46 closes the contact members 23, thereby establishing a circuit from the control bus 13 through conductor 24, actuating coil 25 of the sequence control relay 44, contact members 23 to the control bus 14. The armature and the contact members on the armature of the sequence control relay 44 are thus moved upwardly to close contact members 27 and 29 and to open the contact members 20 and 28. Opening of the contact members 20, however, does not interrupt the circuit for the actuating coil 22 since the energization of the contactor 46 also closed the contact members 26, thereby establishing a holding circuit from the energized conductor 18 through contact members 26 for the actuating coil 22. The pump 2 will thus continue to operate regardless of the changed position of the sequence control relay 44 and the consequent opening of the contact members 20.

Under normal conditions, the pump 4 actuated by the motor 2 will lower the level of the liquid in the sump 42 and the float as it descends will not interfere with the position of the contact member 16 except when the liquid in the sump 42 has been lowered so that the float occupies the position indicated in the figure, thereby opening the circuit at the contact fingers 17 as shown. Opening of the circuit at the contact finger 17 causes the deenergization of the actuating coil 22 with the result that the contact members 26, 23 and the main switch 8, are all opened. The motor 2 thus stops operation; the actuating coil 25 of the sequence control relay 44 is deenergized; and the possibility of a holding circuit is interrupted not only at the contact finger 17 but also at the contact members 26. The friction member 41 of the sequence control relay, however, maintains the contact members 27 and 29 closed and the contact members 20 and 28 open, regardless of the fact that the coil 25 may have been deenergized.

In installations of the type herein indicated several hours or possibly a whole day, may elapse before the liquid in the sump or tank 42 again rises to such a value that the lug 15 on the stem 10 actuates the contact members 16 to bridge the contact finger 17. However, when this does happen, namely, when the sump 42 is again filled to a certain level, contact member 16 will be caused to bridge contact finger 17 whereupon a circuit is established from the energized control bus 13 through the contact finger 17, bridged by the contact member 16, conductors 18 and 19, contact members 29 and 30, conductors 31 and 32, actuating coil 33 of the contactor 45 and conductor 34 to the control bus 14. It should be remembered that the previous opening of the circuit at the contact finger 17 which caused the deenergization of the actuating coil 22 of the contactor 46 caused the closing of the contact members 30.

The energization of the actuating coil 33 causes the closing of the contact members 35, thereby establishing a holding circuit for the actuating coil 33 and also causing the closing of the switch 7 for the motor 1 and the contact members 36 for the actuating coil 37 of the sequence control relay 44. Energization of the coil 37 causes the movement of the armature and the contact members carried thereby of the sequence control relay 44 to the position shown in the figure, thereby opening the contact members 27 and 29 and closing the contact members 20 and 28. Since the contact members 20 are now again closed it will be apparent that conditions are set up for again energizing motor 2 at a third rising of the level of the liquid in the sump 42.

As just pointed out, the energization of contactor 45 causes the closing of switches 7, thereby energizing the motor 1 to drive the pump 3 which thereupon draws liquid through the intake pipe 52 from the sump 42 and discharges it through the tube 47 to some general drainage system. When the liquid level again rises contact fingers 17 are again bridged by the contact member 16 but in this third instance, motor 2 will be caused to operate and at the fourth rising of the liquid, motor 1 will again be energized, etc. In other words, motors 1 and 2 are alternately operated as long as there is no abnormal flow of liquid into the sump 42. If, however, the liquid flowing into the tank or sump 42 is very much increased, the float will at first rise and fall rather rapidly, that is, the motors will be caused to operate alternately at frequent intervals and if the liquid flowing into the sump 42 exceeds the capacity of one pump, it is, of course, clear that the float 9 despite the operation of one of the pumps will, nevertheless, rise in the sump 42. At some specified liquid level in the sump the lug 38 will actuate the contact member 39 to bridge the contact fingers 40, thereby establishing a circuit for the particular contactor 45 or 46 as the case may be, which is not energized, thereby causing the operation of the motor and the pump driven thereby which is at the moment not in operation.

If it be assumed that the motor 1 is operating at the time the liquid level in the sump 42 rises to an abnormal value, then the sequence control relay 44 will be in the position indicated in the figure and in consequence, the bridging of the contact fingers 40 by the contact member 39 will establish a circuit from the control bus 13 through the contact fingers 40, bridged by the contact member 39, contact members 28, actuating coil 22 of the contactor 46, which will thereupon establish its own holding circuit through contact members 26; close the contact members 23; and close the switches 8 to start the operation of the motor 2. The closure of the contact members 23 will have no effect since contact members 36 are also closed, the only effect being that both coils 25 and 37 are energized. Since these coils oppose each other the sequence control relay will remain in the position indicated and the contactors 45 and 46 will, nevertheless, be energized through their respective holding circuits.

As the liquid level in the sump 42 decreases by reason of the operation of both pumps by the motors 1 and 2, the contact member 39 will be actuated by the lug 51 to open the circuit at the contact fingers 40 when the sump is not quite empty but the motors will continue to operate until the float takes the position shown in the drawing, thereby opening the circuit for the actuating coils 22 and 33 at the contact finger 17. Both motors will thus be deenergized and the system will thus again operate to effect the alternate operation of the motors 1 and 2. However, as soon as the liquid in the sump 42 rises to an abnormal value or height, both motors will again be caused to operate to discharge the liquid from the sump 42.

I am aware of the fact that others skilled in the art, after having had the benefit of the teachings of my invention, can devise other circuit diagrams for accomplishing the novel results I have disclosed, and I, therefore, do not wish to be limited to the specific showing herein made but wish to be limited only by the pertinent prior art and the scope of the appended claims.

I claim as my invention:

1. In a system of control for a pair of motors, in combination, a source of electrical energy, a pair of switches adapted to connect the respective motors to the source of energy, a double-coil double-throw contactor, a float controlled switch adapted to energize either one of said pair of switches depending on the position of said double-coil double-throw contactor and circuit arrangements adapted to be interconnected with the source of energy by the float switch and adapted to energize one of the coils of the double-throw switch to thus change its position whereby the particular switch of said pair of switches and the second coil of the double-throw switch not energized by the first operation of the float switch may be caused to be energized by the second operation of said float switch.

2. In a system of control for a pair of motors, in combination, a source of electrical energy, a pair of switches adapted to connect the respective motors to the source of energy, a double-coil double-throw contactor, a float controlled switch adapted to energize either one of said pair of switches depending on the position of said double-coil double-throw contactor, circuit arrangements adapted to be interconnected with the source of energy by the float switch and adapted to energize one of the coils of the double-throw switch to thus change its position whereby the particular switch of said pair of switches and the second coil of the double-throw switch not energized by the first operation of the float switch may be caused to be energized by the second operation of said float switch and a second float controlled switch adapted to energize the one of said pair of switches not caused to be energized by the first float switch.

WILLARD G. COOK.